United States Patent
Vuylsteke

(10) Patent No.: US 11,603,010 B2
(45) Date of Patent: Mar. 14, 2023

(54) PREDICTING CHARGING TIME FOR BATTERY OF ELECTRIFIED VEHICLE

(71) Applicant: Ford Global Technologies, LLC, Dearborn, MI (US)

(72) Inventor: Gabrielle Vuylsteke, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 237 days.

(21) Appl. No.: 17/029,208

(22) Filed: Sep. 23, 2020

(65) Prior Publication Data

US 2022/0089058 A1 Mar. 24, 2022

(51) Int. Cl.
*B60L 58/12* (2019.01)
*H01M 10/42* (2006.01)

(52) U.S. Cl.
CPC ........... *B60L 58/12* (2019.02); *H01M 10/425* (2013.01); *H01M 2010/4278* (2013.01)

(58) Field of Classification Search
CPC .......... B60L 58/12; B60L 53/62; B60L 53/16; H01M 10/425; H01M 2010/4278; H01M 10/44; H01M 10/48; H01M 10/486; H01M 10/443; H01M 2220/20; Y02E 60/10; Y02T 10/70; Y02T 10/7072; Y02T 90/12; Y02T 90/14
See application file for complete search history.

(56) References Cited

U.S. PATENT DOCUMENTS

| | | | |
|---|---|---|---|
| 6,928,372 B2 | 8/2005 | Pozsgay et al. | |
| 8,963,494 B2 | 2/2015 | Kishiyama et al. | |
| 2013/0278225 A1 | 10/2013 | Dietze et al. | |
| 2019/0047435 A1 | 2/2019 | Waffner | |
| 2019/0123574 A1* | 4/2019 | Jung | B60L 58/12 |
| 2021/0370796 A1* | 12/2021 | Seo | H01M 10/486 |
| 2022/0158470 A1* | 5/2022 | Murai | H02J 7/14 |

FOREIGN PATENT DOCUMENTS

| | | |
|---|---|---|
| CN | 107240728 A | 10/2017 |
| CN | 110723029 A | 1/2020 |

OTHER PUBLICATIONS

Zhang, Hongcai, et al "A Prediction Method for Electric Vehicle Charging Load Considering Spatial and Temporal Distribution," Department of Enginerring, Tsinghua University, Tsinghua Tongfang Knowledge Network Technology Co., Ltd., Beijing CN, 2006.

(Continued)

*Primary Examiner* — Nha T Nguyen
(74) *Attorney, Agent, or Firm* — David B. Kelley; Carlson, Gaskey & Olds, P.C.

(57) ABSTRACT

This disclosure relates to predicting a charging time for a battery of an electrified vehicle. An example electrified vehicle includes an electric machine configured to provide rotational output power to drive the electrified vehicle, a battery pack configured to output electrical power to the electric machine, and a controller. The controller is configured to predict a profile indicative of a charging rate of the battery pack. The profile is predicted based on whether the battery pack is predicted to be charged based on at least one charging limit of the battery pack.

17 Claims, 4 Drawing Sheets

(56) References Cited

OTHER PUBLICATIONS

Kejun Qian, et al. "Load Model for Prediction of Electric Vehicle Charging Demand," Engineering, 2010 International Conference on Power System Technology, DOI: 10.1109/POWERCON.2010.5666587, Corpus ID 39833522. Published 2010.

Jun Bi, et al. "Predicting Charging Time of Batter Electric Vehicles Based on Regression and Time-Series Methods: A Case Study of Beijing," Energies, School of Traffic and Transportation, Beiing Jiaotong University, Bijing 100044, China,Published Apr. 17, 2018.

Aabrandt, Andreas, et al. "Prediction and Optimization Methods for Electric Vehicle Charging Schedules in the EDISON Project," Publisher: IEEE, Copyright 2020.

Li Zhengshuo, et al. "Real-time Charging Optimization Method Considering Vehicle Charging Prediction," AEPS: Automation of Electric Power Systems, ISSN 1000-1026; CN 32-1180/TP; vol. 38, Issue 9, 2014, Department of Electrical Engineering, Tsinghua University, Beijing 100084, China.

\* cited by examiner

PREDICTING CHARGING TIME FOR BATTERY OF ELECTRIFIED VEHICLE

TECHNICAL FIELD

This disclosure relates to predicting a charging time for a battery of an electrified vehicle.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

The traction battery is a relatively high-voltage battery that selectively powers the electric machines and other electrical loads of the electrified vehicle. The traction battery of a plug-in electrified vehicle may be charged at public or private electrified vehicle charging stations, for example. Plug-in electrified vehicles include a charging port configured to couple to a plug of the electrified vehicle charging station. When the plug is coupled to the charging port, the electrified vehicle charging station may charge the traction battery.

SUMMARY

An electrified vehicle according to an exemplary aspect of the present disclosure includes, among other things, an electric machine configured to provide rotational output power to drive the electrified vehicle, a battery pack configured to output electrical power to the electric machine, and a controller. The controller is configured to predict a profile indicative of a charging rate of the battery pack. The profile is predicted based on whether the battery pack is predicted to be charged based on at least one charging limit of the battery pack.

In a further non-limiting embodiment of the foregoing electrified vehicle, the controller is configured to use the profile to predict an amount of time remaining until the battery pack reaches a target state of charge.

In a further non-limiting embodiment of any of the foregoing electrified vehicles, the target state of charge is 100%.

In a further non-limiting embodiment of any of the foregoing electrified vehicles, the target state of charge is set by a user and is less than 100%.

In a further non-limiting embodiment of any of the foregoing electrified vehicles, the target state of charge is determined based on a distance to a target driving destination.

In a further non-limiting embodiment of any of the foregoing electrified vehicles, the at least one charging limit is a temperature limit, and, when a temperature of the battery pack is below a temperature threshold, the profile indicates that the battery pack will charge based on the temperature limit.

In a further non-limiting embodiment of any of the foregoing electrified vehicles, the controller predicts a period of time that the battery pack will remain below the temperature threshold.

In a further non-limiting embodiment of any of the foregoing electrified vehicles, the at least one charging limit is a short-term current limit, and, when the battery pack permits charging based on a short-term current limit, the profile indicates that the battery pack will charge based on the short-term current limit.

In a further non-limiting embodiment of any of the foregoing electrified vehicles, when the battery pack permits charging based on a plurality of short-term current limits, the profile indicates the battery pack will charge based on each of the short-term current limits.

In a further non-limiting embodiment of any of the foregoing electrified vehicles, the at least one charging limit is a cell protection limit, and, when the controller predicts that an environmental condition or a condition of the battery pack will meet or exceed a cell protection threshold, the profile indicates that the battery pack will charge based on the cell protection limit.

In a further non-limiting embodiment of any of the foregoing electrified vehicles, the profile indicates whether the battery pack is predicted to charge using constant current charging or constant voltage charging.

In a further non-limiting embodiment of any of the foregoing electrified vehicles, the electrified vehicle includes a charging port configured to couple to a plug.

In a further non-limiting embodiment of any of the foregoing electrified vehicles, the plug is a plug of an electrified vehicle charging station.

In a further non-limiting embodiment of any of the foregoing electrified vehicles, the electrified vehicle is one of a battery electric vehicle and a plug-in hybrid electric vehicle.

A method according to an exemplary aspect of the present disclosure includes, among other things, predicting a profile indicative of a charging rate of a battery pack. The profile is predicted based on whether the battery pack is predicted to be charged based on at least one charging limit of the battery pack.

In a further non-limiting embodiment of the foregoing method, the method includes using the profile to predict an amount of time remaining until the battery pack reaches a target state of charge.

In a further non-limiting embodiment of any of the foregoing methods, the at least one charging limit is a temperature limit, and, when a temperature of the battery pack is below a temperature threshold, the profile indicates the battery pack will charge based on the temperature limit for a period of time.

In a further non-limiting embodiment of any of the foregoing methods, the at least one charging limit is a short-term current limit, and, when the battery pack permits charging based on a short-term current limit, the profile indicates the battery pack will charge based on the short-term current limit.

In a further non-limiting embodiment of any of the foregoing methods, the at least one charging limit is a cell protection limit, and, when an environmental condition or a condition of the battery pack is predicted to meet or exceed a cell protection threshold, the profile indicates the battery pack will charge based on the cell protection limit.

In a further non-limiting embodiment of any of the foregoing methods, the profile indicates whether the battery pack is predicted to charge using constant current charging or constant voltage charging.

DETAILED DESCRIPTION

This disclosure relates to predicting a charging time for a battery of an electrified vehicle. An example electrified vehicle includes an electric machine configured to provide rotational output power to drive the electrified vehicle, a battery pack configured to output electrical power to the electric machine, and a controller. The controller is configured to predict a profile indicative of a charging rate of the battery pack. The profile is predicted based on whether the battery pack is predicted to be charged based on at least one charging limit of the battery pack. This disclosure provides an accurate charging time estimate, which increases user confidence and satisfaction. These and other benefits will be appreciated from the following written description.

Figure 1:
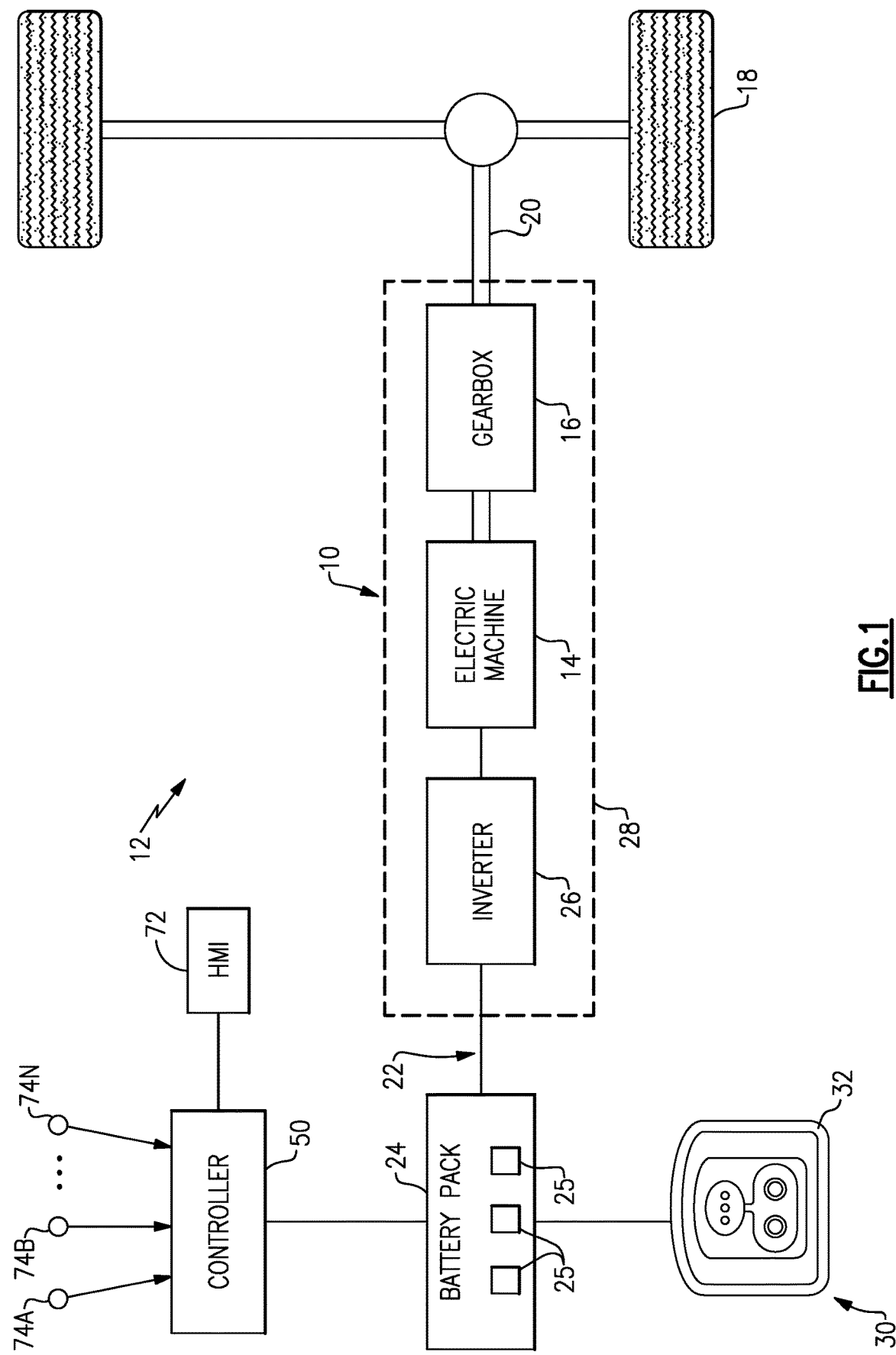
FIG. 1 schematically illustrates various components, including a powertrain, of an electrified vehicle.

FIG. 1 schematically illustrates a powertrain 10 of an electrified vehicle 12. Although depicted as a battery electric vehicle (BEV), it should be understood that the concepts described herein are not limited to BEVs and could extend to other electrified vehicles, including other plug-in electrified vehicles such as plug-in hybrid electric vehicles (PHEVs). Therefore, although not shown in this embodiment, the electrified vehicle 12 could be equipped with an internal combustion engine that can be employed either alone or in combination with other energy sources to propel the electrified vehicle 12.

In a non-limiting embodiment, the electrified vehicle 12 is a full electric vehicle propelled solely through electric power, such as by an electric machine 14, without any assistance from an internal combustion engine. The electric machine 14 may operate as an electric motor, an electric generator, or both. The electric machine 14 receives electrical power and provides a rotational output power. The electric machine 14 may be connected to a gearbox 16 for adjusting the output torque and speed of the electric machine 14 by a predetermined gear ratio. The gearbox 16 is connected to a set of drive wheels 18 by an output shaft 20. A high voltage bus 22 electrically connects the electric machine 14 to a battery pack 24 through an inverter 26. The electric machine 14, the gearbox 16, and the inverter 26 may collectively be referred to as a transmission 28.

The battery pack 24 is an energy storage device and, in this example, is an exemplary electrified vehicle battery. In this regard, the battery pack 24 may be referred to simply as a "battery." The battery pack 24 may be a high voltage traction battery pack that includes a plurality of battery assemblies 25 (i.e., battery arrays or groupings of battery cells) capable of outputting electrical power to operate the electric machine 14 and/or other electrical loads of the electrified vehicle 12. Other types of energy storage devices and/or output devices can also be used to electrically power the electrified vehicle 12.

The electrified vehicle 12 also includes a charging system 30 for periodically charging the cells of the battery pack 24. The charging system 30 may be connected to an external power source, such as an electrical grid 64 (FIG. 2), for receiving and distributing power to the cells.

In one non-limiting embodiment, the charging system 30 includes an interface, which in this example is a charging port 32 located on-board the electrified vehicle 12. The charging port 32 is adapted to selectively receive power from an external power source, such as from a power cable connected to the external power source, and then distribute the power to the battery pack 24 for charging the cells. One example external power source is an electrified vehicle charging station 60 (FIG. 2), such as a publically available electrified vehicle charging station. In another example, the electrified vehicle charging station is private, such as those at homes or businesses. The charging port 32 may be configured to couple to a plug supplying alternating current (AC) power or a plug supplying direct current (DC) power. In this regard, the charging system 30 may be equipped with power electronics used to convert AC power received from an external power supply to DC power for charging the cells of the battery pack 24. The charging system 30 may also include a DC-to-DC converter in some examples. The charging system 30 may also accommodate one or more conventional voltage sources from the external power supply (e.g., 110 volt, 220 volt, etc.).

The electrified vehicle 12 further includes a controller 50, which may be programmed with executable instructions for interfacing with and operating the various components of the electrified vehicle 12. The controller 50 is configured to receive information from the electrified vehicle 12 and is configured to interpret that information and issue commands to various components of the electrified vehicle 12 based on that information. The controller 50 is shown schematically in FIGS. 1 and 2. It should be understood that the controller 50 may include hardware and software, and could be part of an overall vehicle control module, such as a body control module (BCM) or vehicle system controller (VSC), or could alternatively be a stand-alone controller separate from the BCM or VSC. Further, the controller 50 may be programmed with executable instructions for interfacing with and operating the various components of the electrified vehicle 12. The controller 50 additionally includes a processing unit and non-transitory memory for executing the various control strategies and modes of the vehicle system.

Figure 2:
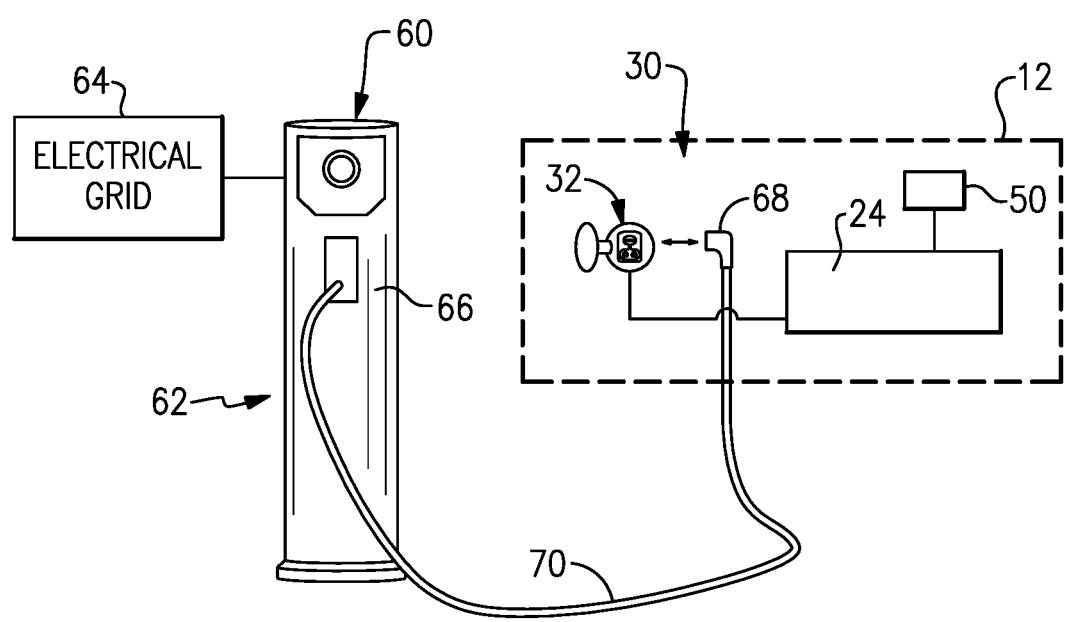
FIG. 2 schematically illustrates an electrified vehicle adjacent an electrified vehicle charging station.

FIG. 2 schematically illustrates an electrified vehicle 12, namely a plug-in electrified vehicle such as a BEV or PHEV, relative to an electrified vehicle charging station 60 ("charging station 60"). The charging station 60 is configured to either directly or indirectly charge the battery pack 24. The charging station 60 includes a tether-type charger assembly 62 and is coupled to an electrical grid 64, which is a grid power source. The charger assembly 62 conveys power from the electrical grid 64 to the electrified vehicle 12. In this example, the charger assembly 62 includes a terminal 66, a plug 68, and a charger cable 70 between the terminal 66 and the plug 68. The plug 68 may have a standard plug configuration corresponding to that of the charging port 32. While an example charging station 60 is shown, this disclosure extends to other types of vehicle-to-grid interfaces.

Charging the electrified vehicle 12 using the charging station 60 involves positioning the electrified vehicle 12 near the charging station 60 and electrically coupling the plug 68 to the electrified vehicle 12 via charging port 32. Power can then move from the electrical grid 64 to the electrified vehicle 12, and specifically to the battery pack 24. The battery pack 24 can be charged when the electrified vehicle 12 is in a charging position.

In this disclosure, the controller 50 is configured to predict a charging time of the battery pack 24 and to relay that predicted charging time to a user via a human-machine interface ("HMI") 72 (FIG. 1). The predicted charging time is the time the controller 50 predicts that it will take the battery pack 24 to charge from its present state of charge ("SOC") to a target SOC. In a specific example, the predicted charging time is the time remaining, during charging, until a target SOC is reached. The HMI 72 may be a display inside the electrified vehicle 12. The HMI 72 may alternatively or additionally be a mobile device, such as a mobile phone, of the user. Further, the HMI may alternatively or additionally be a cloud-based user interface, such as an application, where the user can access and view the predicted charging time.

The controller 50 is configured to receive a plurality of inputs 74A-74N for use in predicting the charging time of the battery pack 24. In FIG. 1, the ellipsis between 74B and 74N is representative of the controller 50 receiving any number of inputs. In particular, this disclosure extends to configurations where the controller 50 receives one or more inputs.

The inputs 74A-74N include, as examples, a present state of charge (SOC) of the battery pack 24, a capacity of the battery pack 24, ambient conditions such as temperature and pressure of the electrified vehicle 12, present conditions of the electrified vehicle 12 including conditions associated with the heating, ventilation and cooling (HVAC) system of the electrified vehicle 12, the DC/DC converter, the powertrain, and a battery charging module. The inputs 74A-74N may further include inputs relating to trip planning, such as a target destination, global positioning system (GPS) information, real-time traffic updates, etc. The inputs 74A-74N may further include the power associated with an electric heater or other thermal management systems of the battery pack 24. The inputs 74A-74N may additionally include the current flowing through the battery pack 24, the voltage of the battery pack 24, the available maximum energy of the battery pack 24, and the maximum battery cell voltage (e.g., the voltage of the battery assemblies 25). The inputs 74A-74N further may include the charging capabilities of the charging station 60, the charge power mode of the charging station 60, and/or the maximum charging power of the charging station 60, such as whether the charging station is a DC fast charging station. Another example input includes a drive history of the electrified vehicle 12. These inputs 74A-74N are exemplary. Additional or fewer inputs may be used.

Based on the inputs 74A-74N, the controller 50 is configured to predict a profile indicative of a charging rate of the battery pack 24. The profile is a predicted relationship between a state of charge (SOC) of the battery pack 24 and time, and can be used by the controller 50 to predict an amount of time it will take for the battery pack 24 to reach a particular SOC. The profile does not assume that the battery pack 24 will charge at a constant rate throughout the entirety of a charging cycle (i.e., the time between a present SOC and a target SOC). Rather, depending on the inputs 74A-74N, the profile indicates that the battery pack 24 will charge at a plurality of different rates over the charging cycle.

Figure 3:
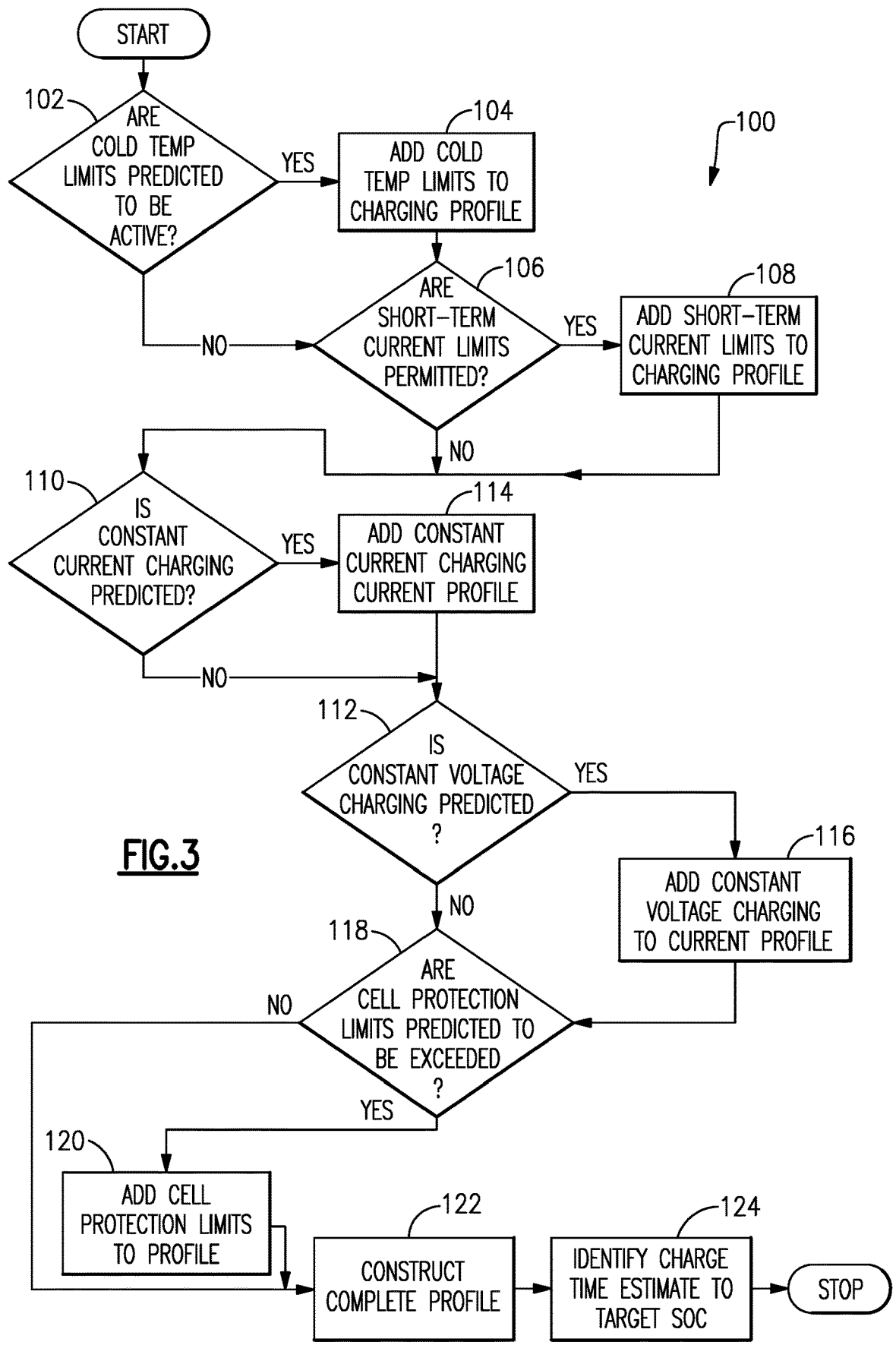
FIG. 3 is a flow chart representative of an example method.

FIG. 3 is a flow chart representative of an example method 100 of predicting a profile between a present SOC of the battery pack 24 and a target SOC. Various additional aspects of the electrified vehicle 12 and the profile will be described relative to FIG. 3. It should be understood that the components described and shown in FIGS. 1 and 2 are used to carry out the example method 100.

The profile created using the method 100 is used by the controller 50 to predict an amount of time it will take the battery pack 24 to charge from its present SOC to a target SOC. In one example, the target SOC is a full charge, namely 100% SOC. The controller 50 may also use a predefined target SOC which is less than 100% SOC. In another example, the target SOC is set by a user, and, again, can either be 100% SOC or less than 100% SOC, such as an 80% SOC. In yet another example, the target SOC is set by the controller 50 based on a predicted charge required for the electrified vehicle 12 to reach a target driving destination. In that example, the controller 50 may use GPS, traffic information, etc., to predict the target SOC.

In the method 100, the controller 50 first determines whether the battery pack 24 is being charged, such as whether the electrified vehicle 12 is on plug (i.e., the plug 68 is coupled to the charging port 32) and the charging station 60 is active. If so, then the method 100 begins, at 102, with the controller 50 determining whether one or more cold temperature limits are predicted to be active during the upcoming charging cycle (i.e., the period between the present SOC and the target SOC). A cold temperature limit is one of a plurality of charging limits associated with the battery pack 24 that acts as a limit on the charging rate of the battery pack 24. These charging limits are typically defined by the manufacturer of the battery pack 24 and/or the manufacturer of the individual battery assemblies 25. The charging limits are known by (e.g., programmed into or readily accessible by) the controller 50.

At 102, the controller 50 receives information from one or more sensors indicative of a temperature of the battery pack 24 and/or an ambient temperature of the electrified vehicle 12. At 102, if the controller 50 determines that the temperature of the battery pack 24 is presently below a temperature threshold or predicted to fall below a temperature threshold, then, at 104, the controller 50 predicts that the battery pack 24 will charge based on one or more cold battery temperature limits for a period of time. The controller 50 predicts, based on ambient conditions of the electrified vehicle 12, the current temperature of the battery pack 24, and/or based on information pertaining to an electric heater of the battery pack 24, the period of time that the cold battery temperature limits will be active. In an example, if the present temperature of the battery pack 24 is 0° C., and the temperature threshold is 5° C., then the controller 50 will determine that cold battery temperature limits will be active at the beginning of charging for a period of time. The controller 50 may determine that the cold battery temperature limit will be active for 10 mins, which is a period of time the controller 50 predicts that it will take for a temperature of the battery pack 24 to meet or exceed 5° C. In other examples, additional cold temperature limits may be in place. For instance, the controller 50 may predict that the battery pack 24 will charge according to a first cold temperature limit until the battery pack 24 heats from −10° C. to 0° C. Then, in that example, the controller 50 predicts the battery pack 24 will charge according to a second cold temperature limit, which permits additional current through the battery pack 24 than the first cold temperature limit, until the battery pack 24 heats from 0° C. to 5° C. In either case, in response to instructions from the controller 50, various components of the electrified vehicle 12 and/or the charging station 60 are configured to limit the current flowing through the battery pack 24 while the cold battery temperature limits, or any of the charging limits discussed herein, are in place. The specific temperatures mentioned in this paragraph (i.e., −10° C., 0° C., and 5° C.) are exemplary and this disclosure extends to other temperature thresholds.

At 106, the controller 50 next determines whether short-term current limits are permitted. Short-term current limits are additional example charging limits associated with the battery pack 24. Short-term current limits permit charging of the battery pack 24 at relatively high current levels for a predefined, relatively short, period of time. For instance, the battery pack 24 may be rated, by the manufacturer for example, to charge at 500 Amps for 5 minutes, and then to charge at 400 Amps for 10 minutes, and then to charge at 300 Amps for 15 minutes. This example amounts to 30 minutes of charging at a rate exceeding a current associated with normal charging of the battery pack 24. By permitting charging at relatively high currents for short periods of time, the battery pack 24 charges relatively quickly and wear on the battery pack 24 is reduced relative to scenarios where the battery pack 24 charges at relatively high currents for prolonged periods. If short-term current limits are permitted, the controller 50 adds each of those short-term current limits to the profile, at 108. The controller 50 adds to the profile the amount of time associated with each short-term current limit, and further adds to the profile when in the charging cycle the battery pack 24 is predicted to charge based on each short-term current limit.

At 110, the controller 50 considers whether the battery pack 24 is predicted to charge based on constant current charging and, at 112, the controller 50 considers whether the battery pack 24 is predicted to charge based on constant voltage charging. During constant current charging, the charging station 60 supplies a relatively uniform current to the battery pack 24, regardless of other variables, such as the present battery SOC, the present temperature of the battery pack 24, or the present ambient temperature of the electrified vehicle 12. During constant voltage charging, the charging station 60 supplies a relatively uniform voltage to the battery pack 24. Constant voltage charging typically occurs when the battery SOC is relatively high, such as 90% SOC or above. If constant current charging is predicted to occur, then it is added to the profile at 114. Likewise, if constant voltage charging is predicted to occur, then it is added to the profile at 116. When the controller 50 adds constant current and/or constant voltage charging to the profile, the controller 50 also adds the predicted amount of time associated with each type of charging to the profile. The controller 50 also updates the profile such that the profile indicates when each type of charging will occur.

At 118, the controller 50 predicts whether the battery pack 24 will be charged according to one or more cell protection limits. Cell protection limits are additional example charging limits associated with the battery pack 24. Example cell protection limits include excessive current during charging, high ambient temperature, high temperature of the battery pack 24, high pressure build up inside the battery pack 24 and/or battery assemblies 25, etc. The controller 50 may predict that an environmental condition and/or a condition of the battery pack 24 (i.e., one of the inputs 74A-74N) may approach a cell protection threshold associated with a cell protection limit. If so, the controller 50 adds that cell protection limit charging to the profile, at 120. While cell protection limit charging can occur at any time, the battery pack 24 is known to charge according to cell protection limits between constant current charging and constant voltage charging. Thus, in one exemplary aspect of this disclosure, the controller 50 may be programmed to predict whether cell protection limits will be in place after constant current charging occurs for a period of time. When adding the cell protection limit to the profile, the controller 50 predicts the amount of time the battery pack 24 is expected to charge according to the cell protection limit and when that charging limit will occur. Notably, the battery pack 24 will not necessarily charge according to the predicted cell protection limits. Rather, the controller 50 merely predicts, for purposes of building a profile that can deliver an accurate charging time estimate to the user, that the battery pack 24 will charge according to one or more cell protection limits. The controller 50 will use real-time information, during the charging cycle, to determine whether the battery pack 24 should charge according cell protection limits.

At 122, the controller 50 completes the profile based on the results of the aforementioned steps of the method 100. At 124, the controller 50 uses the profile to predict an amount of time it will take the battery pack 24 to charge from its present SOC to the target SOC. That prediction is relayed to the user via the HMI 72.

Figure 4:
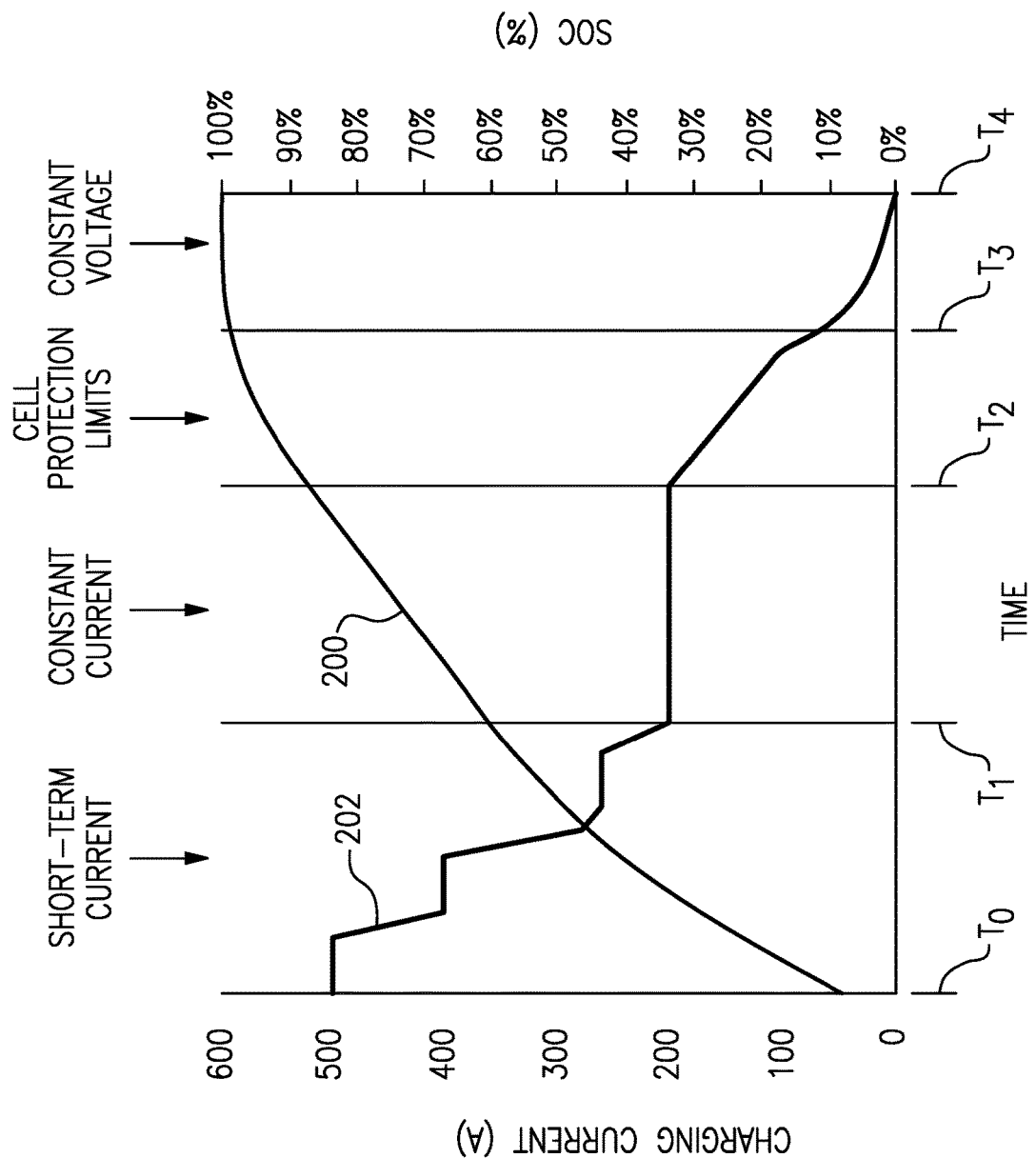
FIG. 4 is a graph representative of an example profile created using the example method.

FIG. 4 graphically illustrates an example profile created using the method 100. In FIG. 4, the profile 200 is represented by a line on a graph with time on the X-axis and SOC of the battery pack 24 on the right-hand Y-axis. The Y-axis also includes charging current on the left-hand side. A line 202 is shown which indicates a predicted charging current flowing through the battery pack 24 during the charging cycle.

The profile 200 graphically represents how the SOC of the battery pack 24 is predicted to change over time under a certain set of conditions. In particular, in the example of FIG. 4, the battery pack 24 begins with 10% SOC at time $T_0$. The controller 50 performs the entire method 100 at or around time $T_0$, based on the conditions (i.e., the inputs 74A-74N) present at or around time $T_0$, in order to create the profile 200. In other examples, the controller 50 can predict how the inputs 74A-74N will change over the charging cycle, and account for those predicted changes when creating the profile at time $T_0$. In another example, the controller 50 can update the inputs 74A-74N in real time during a charging cycle and update the profile, as needed, to account for a change in the inputs 74A-74N.

In the example of FIG. 4, the target SOC is 100% SOC, and the controller 50 determines that at time $T_4$ the battery pack 24 will reach 100% SOC. Time $T_4$ may be about 2 hours, in an example. Time $T_4$ is reported to the user via the HMI 72 at or around time $T_0$. The controller 50 can also send updated charge time estimates to the HMI 72.

With reference to the method 100 and the example of FIG. 4, the controller 50, at 102, predicts that the temperature of the battery pack 24 is above the temperature threshold such that cold temperature limits are not active. At 106, the controller 50 predicts that the battery pack 24 permits short-term current limits. As such, at 108, the controller 50 adds to the profile 200 a number of short-term current limits. In this example, between time $T_0$ and $T_1$, the profile 200 indicates that the battery pack 24 will charge at 500 Amps for a period of time beginning at time $T_0$, then at 400 Amps for a period of time, and then at 250 Amps for a period of time until time $T_1$ is reached.

At time $T_1$, the SOC of the battery pack 24 is predicted to reach about 60% SOC. From time $T_1$ to $T_2$, the controller 50 determines, at 110, that the battery pack 24 will be charged based on constant current charging. In the example, the battery pack 24 is charged at 200 Amps from time $T_1$ to $T_2$. At time $T_2$, the SOC of the battery pack 24 is predicted to be about 85% SOC.

The controller 50 predicts, at 118, that the battery pack 24 will be charged based on one or more cell protection limits from time $T_2$ to $T_3$. For example, the controller 50 could base this prediction, using the inputs 74A-74N, on a predicted temperature or pressure of the battery pack 24. At time $T_3$, with the SOC of the battery pack 24 predicted to be at about 95% SOC, the controller 50 predicts, at 112, that the battery pack 24 will charge based on constant voltage charging until the battery pack reaches 100% SOC at $T_4$.

Again, FIG. 4 is representative one example profile. The method 100 can be used to create any number of profiles. As another example profile, the battery pack 24 could have a present charge of 10% SOC, as in the example of FIG. 4, and the target SOC may be 50% SOC. In that example, controller 50 may determine that the target SOC can be reached by charging the battery pack 24 according to short-term current limits. In that case, the profile would not include constant current or constant voltage charging. Various other example profiles come within the scope of this disclosure.

Reference to predictions, such as the controller 50 making predictions, includes the controller 50 using a lookup table and/or an algorithm to output a prediction based on one or more of the inputs 74A-74N. In the example of FIG. 4, the profile 200 is created using the method 100, based on a plurality of predictions of the controller 50, and the profile 200 is indicative of each of those predictions.

It should be understood that terms such as "about" and "substantially" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. An electrified vehicle, comprising:
   an electric machine configured to provide rotational output power to drive the electrified vehicle;
   a battery pack configured to output electrical power to the electric machine; and
   a controller configured to predict a profile indicative of a charging rate of the battery pack, wherein the profile is predicted based on whether the battery pack is predicted to be charged based on at least one charging limit of the battery pack, wherein the controller is configured to use the profile to predict an amount of time remaining until the battery pack reaches a target state of charge,
   wherein the profile includes a prediction that the battery pack will charge based on a first charging limit beginning at a first point in time and lasting for a first amount of time,
   wherein the profile includes a prediction that the battery pack will charge based on a second charging limit beginning at a second point in time and lasting for a second amount of time,
   wherein the second charging limit is of a different type than the first charging limit,
   wherein the second amount of time is different than the first amount of time,
   wherein the second point in time is after the first point in time.

2. The electrified vehicle as recited in claim 1, wherein the target state of charge is 100%, is set by a user to be less than 100%, or is determined based on a distance to a target driving destination.

3. The electrified vehicle as recited in claim 1, wherein:
   the first charging limit is a temperature limit, and
   when a temperature of the battery pack is below a temperature threshold, the profile indicates that the battery pack will charge based on the temperature limit.

4. The electrified vehicle as recited in claim 3, wherein the controller predicts a period of time that the battery pack will remain below the temperature threshold.

5. The electrified vehicle as recited in claim 1, wherein:
   the first charging limit is a short-term current limit, and
   when the battery pack permits charging based on a short-term current limit, the profile indicates that the battery pack will charge based on the short-term current limit.

6. The electrified vehicle as recited in claim 5, wherein, when the battery pack permits charging based on a plurality of short-term current limits, the profile indicates the battery pack will charge based on each of the short-term current limits.

7. The electrified vehicle as recited in claim 1, wherein:
   the first charging limit is a cell protection limit, and
   when the controller predicts that an environmental condition or a condition of the battery pack will meet or exceed a cell protection threshold, the profile indicates that the battery pack will charge based on the cell protection limit.

8. The electrified vehicle as recited in claim 1, wherein the profile indicates whether the battery pack is predicted to charge using constant current charging or constant voltage charging.

9. The electrified vehicle as recited in claim 1, further comprising:
   a charging port configured to couple to a plug, and
   wherein the electrified vehicle is one of a battery electric vehicle and a plug-in hybrid electric vehicle.

10. The electrified vehicle as recited in claim 1, wherein:
    the profile includes a prediction that the battery pack will charge based on a third charging limit beginning at a third point in time and lasting for a third amount of time,
    the third charging limit is of a different type than the first and second charging limits,
    the third amount of time is different than the first and second amounts of time,
    the third point in time is after the second point in time.

11. The electrified vehicle as recited in claim 10, wherein the first, second, and third charging limits are each selected from the group consisting of a temperature limit, a short-term current limit, and a cell protection limit.

12. A method, comprising:
    predicting a profile indicative of a charging rate of a battery pack, wherein the profile is predicted based on whether the battery pack is predicted to be charged based on at least one charging limit of the battery pack; and
    using the profile to predict an amount of time remaining until the battery pack reaches a target state of charge,
    wherein the profile includes a prediction that the battery pack will charge based on a first charging limit beginning at a first point in time and lasting for a first amount of time, wherein the profile includes a prediction that the battery pack will charge based on a second charging limit beginning at a second point in time and lasting for a second amount of time, wherein the second charging limit is of a different type than the first charging limit, wherein the second amount of time is different than the first amount of time, wherein the second point in time is after the first point in time.

13. The method as recited in claim 12, wherein:

the first charging limit is a temperature limit, and when a temperature of the battery pack is below a temperature threshold, the profile indicates the battery pack will charge based on the temperature limit for a period of time.

14. The method as recited in claim 12, wherein:

the first charging limit is a short-term current limit, and when the battery pack permits charging based on a short-term current limit, the profile indicates the battery pack will charge based on the short-term current limit.

15. The method as recited in claim 12, wherein:

the first charging limit is a cell protection limit, and when an environmental condition or a condition of the battery pack is predicted to meet or exceed a cell protection threshold, the profile indicates the battery pack will charge based on the cell protection limit.

16. The method as recited in claim 12, wherein the profile indicates whether the battery pack is predicted to charge using constant current charging or constant voltage charging.

17. The method as recited in claim 12, wherein the first and second charging limits are both selected from the group consisting of a temperature limit, a short-term current limit, and a cell protection limit.

* * * * *